Oct. 29, 1935.　　　　A. S. MEYER　　　　2,018,862
MOTOR VEHICLE
Filed Sept. 8, 1932　　　3 Sheets-Sheet 1
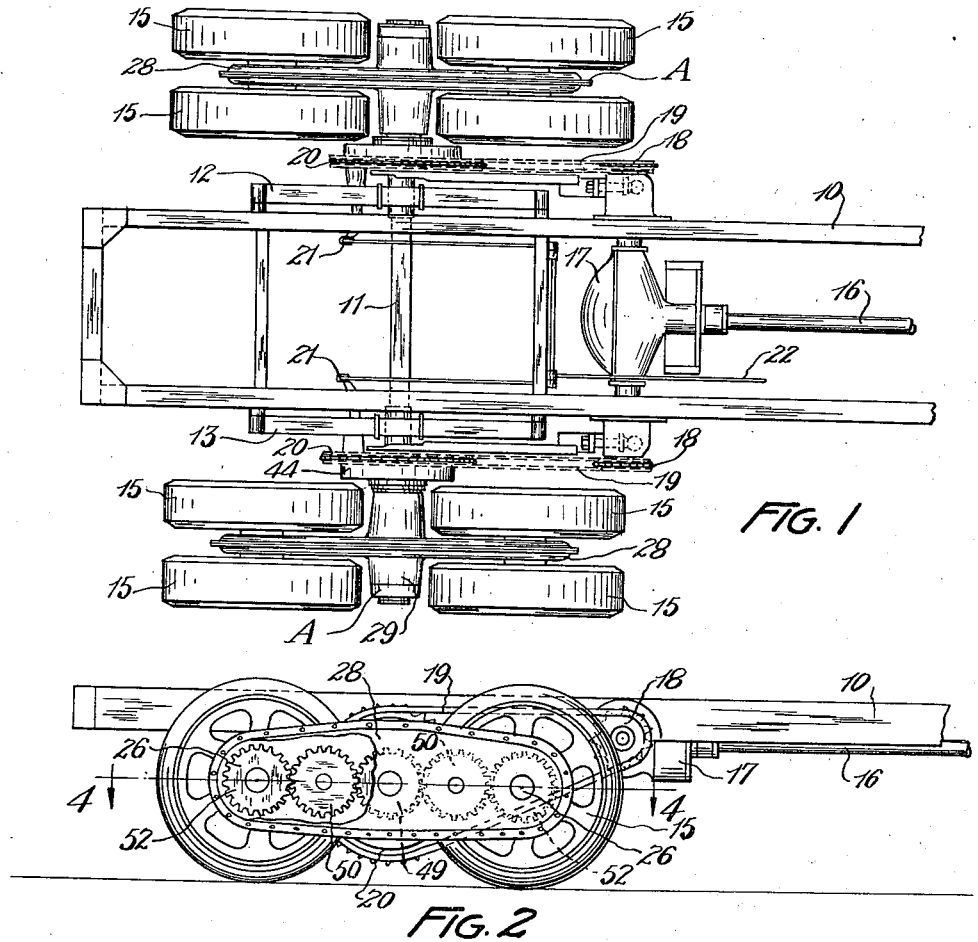
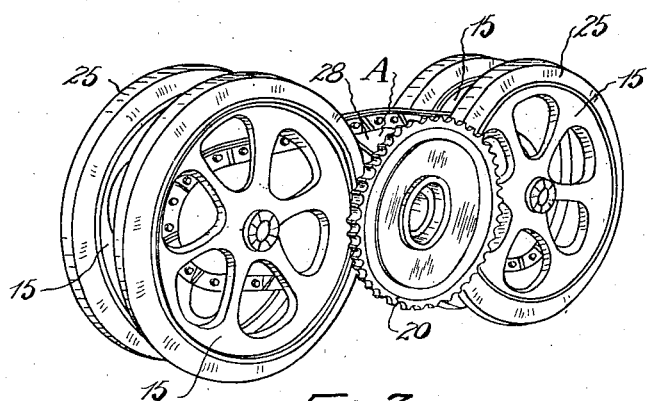
INVENTOR:
ARTHUR S. MEYER
ATTORNEYS Oct. 29, 1935.  A. S. MEYER  2,018,862
MOTOR VEHICLE
Filed Sept. 8, 1932    3 Sheets-Sheet 2

INVENTOR:
ARTHUR S. MEYER
ATTORNEYS

INVENTOR:
ARTHUR S. MEYER
Kirio Hudson & Kent
ATTORNEYS

Patented Oct. 29, 1935

2,018,862

UNITED STATES PATENT OFFICE 2,018,862

MOTOR VEHICLE

Arthur S. Meyer, Cleveland Heights, Ohio, assignor to The Browning Crane & Shovel Co., Cleveland, Ohio, a corporation of Ohio Application September 8, 1932, Serial No. 632,171

6 Claims. (Cl. 180—22)

The present invention relates to motor driven vehicles and more particularly to an eight wheel drive rear axle assembly and a four wheel drive wheel assembly for such vehicles.

Many of the conventional motor driven vehicles on the market and in operation today are of the four or six wheel type, etc., provided with two or four wheel drive rear axle assemblies respectively, and it is an object of the present invention to provide means for converting these vehicles into ten wheel vehicles provided with eight wheel drive rear axle assemblies.

The eight wheel drive of the present invention produces new and improved results over the conventional two and four wheel drives, etc., in that the load is distributed over ten wheels instead of four or six, and the smaller load per wheel reduces the road bed pressure, gives the vehicle a wider range of operation, reduces wear on the tires, which may be either solid or pneumatic, and permits greater speeds over rough and bad roads, etc.

Another object of the invention is the provision of a novel eight-wheel drive rear axle assembly for a motor driven vehicle which can be substituted for the rear axle assembly in a conventional motor driven vehicle of preferably the two or four wheel drive type and thus convert the vehicle into a ten wheel vehicle of the eight wheel drive rear axle assembly type.

Another object of the invention is the provision of a four wheel drive wheel assembly for a motor driven vehicle which can be substituted for the wheel assembly of a conventional motor driven vehicle, preferably of the two or four wheel drive type and thus convert the vehicle into a ten wheel vehicle of the eight wheel drive rear axle assembly type.

Other objects and advantages of the invention will be apparent to those skilled in the art from the following description of the preferred embodiments of the invention described with reference to the accompanying drawings, in which:

Fig. 1 is a plan view of the rear end of a conventional truck chassis equipped with the wheel assemblies of the present invention;

Fig. 2 is a front elevation of the device shown in Fig. 1, with portions broken away;

Fig. 3 is a perspective view of one of the wheel assemblies;

Similar reference characters designate corresponding parts throughout the several figures of the drawings.

Figure 4:
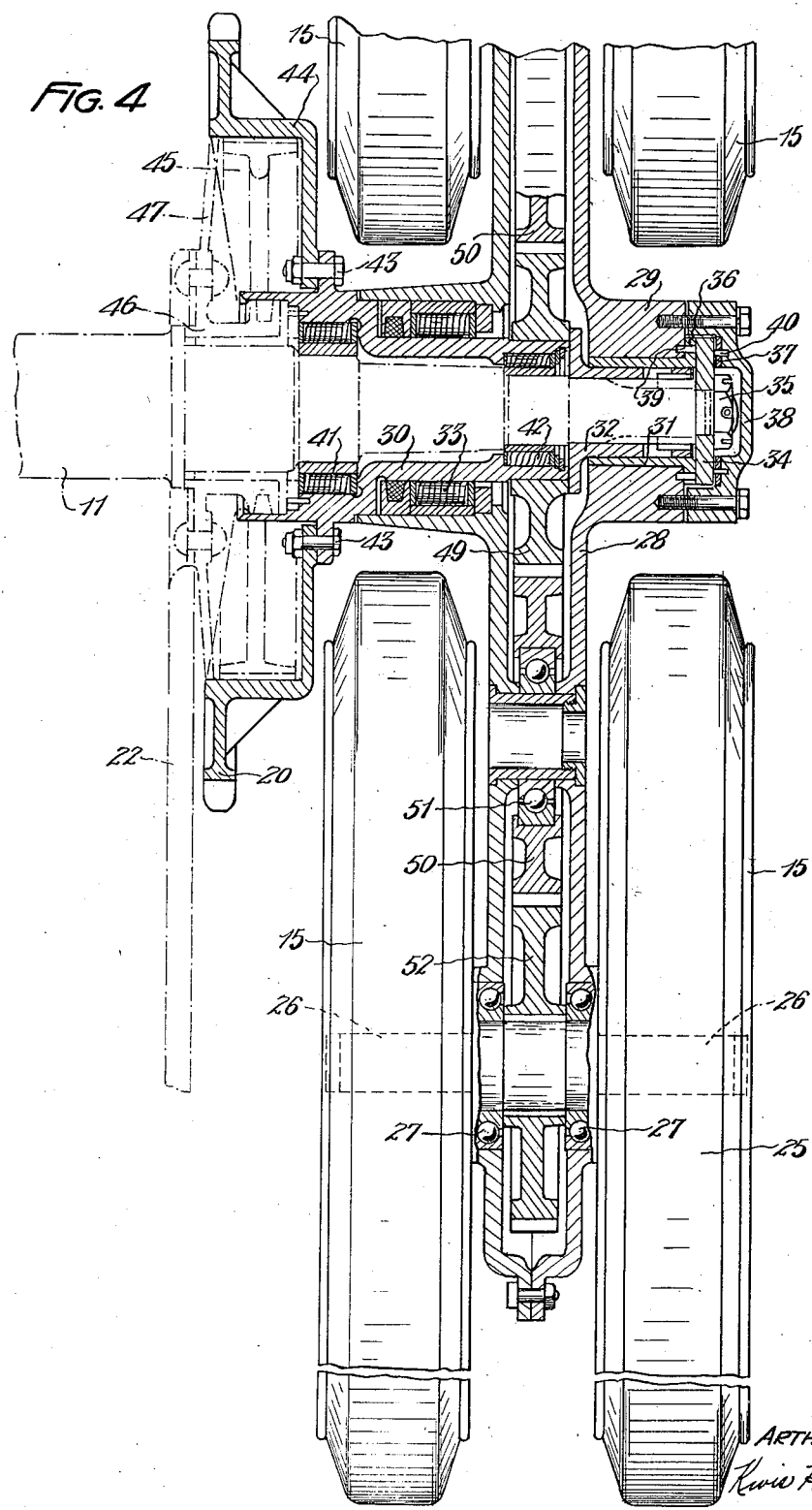
Fig. 4 is a section on the line 4—4 of Fig. 2, with portions in elevation and the standard parts of the truck shown in dotted lines.

Referring to the drawings, Fig. 1 shows the rear end of a conventional truck of the chain drive type well known in the art. The two wheel drive wheel assemblies with which the truck was originally equipped have been removed and the four wheel drive wheel assemblies of the present invention substituted therefor.

The frame of the truck is designated in general by the reference character 10, and is supported on the rear axle 11 by the springs 12 and 13. The wheels 15 of the wheel assemblies A pivotally connected to opposite ends of the axle 11, are driven from the motor, not shown, through the drive shaft 16, jack shaft assembly 17, front sprockets 18, sprocket chain 19, and rear sprockets 20. The brake mechanism is indicated in general by the reference character 21, and the reference character 22 designates the radius rods. The wheel assemblies A are duplicates in construction and only one will be described in detail.

The wheels 15, which are provided with solid tires 25, as illustrated, but which may be provided with pneumatic tires, if desired, are keyed to short shafts 26 rotatably supported by anti-friction bearings 27 in a housing 28 provided with a hub 29. The housing 28 formed in two halves bolted together is adapted to be pivotally supported on the axle 11 and a sleeve member 30 by bushings 31, 32 and an anti-friction bearing 33 respectively. The housing 28 is retained in position on the axle 11 by a washer 34, adapted to be secured to the end of the axle as by a nut 35, and which projects between a flange 36 on the bushing 31 and a bushing 37 secured to a hub cap 38 which closes the opening in the hub 29 through which the axle 11 projects. The bushings or wear plates 31 and 37 are attached to the hub 29 and the hub cap 38 by pins 39 and 40 respectively.

The sleeve member 30 is adapted to be rotatably supported on the axle 11 by anti-friction bearings 41 and 42 and carries the sprocket wheel 20 bolted thereto, as by the bolts 43. In the particular construction of truck illustrated, the brake drum 44 is formed integral with the sprocket wheel 20. The brake shoes are indicated by the reference character 45, and the reference character 46 designates a collar supported by the axle 11 and provided with flange 47 for enclosing the brake, etc. These elements are standard parts of the truck and may vary with the particular construction of truck employed. The sleeve member 30 is not a standard part of the truck but the construction thereof will also vary to accommodate the construction of the truck employed.

The wheels 15 are driven from the sleeve member 30 through a gear 49, keyed to the outside end thereof, in mesh with idler gears 50 rotatably supported in the housing 28 by antifriction bearings 51. The idler gears 50 are in mesh with gears 52 keyed to the shafts 26.

From the foregoing description it will be apparent that any conventional four or six wheel truck etc. can be converted to a ten wheel truck by merely replacing the wheel assemblies with which it is equipped with the wheel assemblies of the present invention, and that all of the wheels 15 on each assembly will be driven from the sprocket wheel 20 through sleeve 30, the gears 49, 50, 52 and shafts 26. While a gear drive is shown between the sleeve member 30 and the shafts 26, a chain drive may be substituted in which event a driving sprocket would be keyed to the sleeve member 30, replacing the gear 49, and driven sprockets would be keyed to the shafts 26 replacing the gears 52, all connected by a sprocket chain. The center of the axis 11 may be higher than that of the shafts 26 to provide more clearance between the front and back wheels, or the housing 28 may be raised in the center, as illustrated, for the same purpose.

Figure 5:
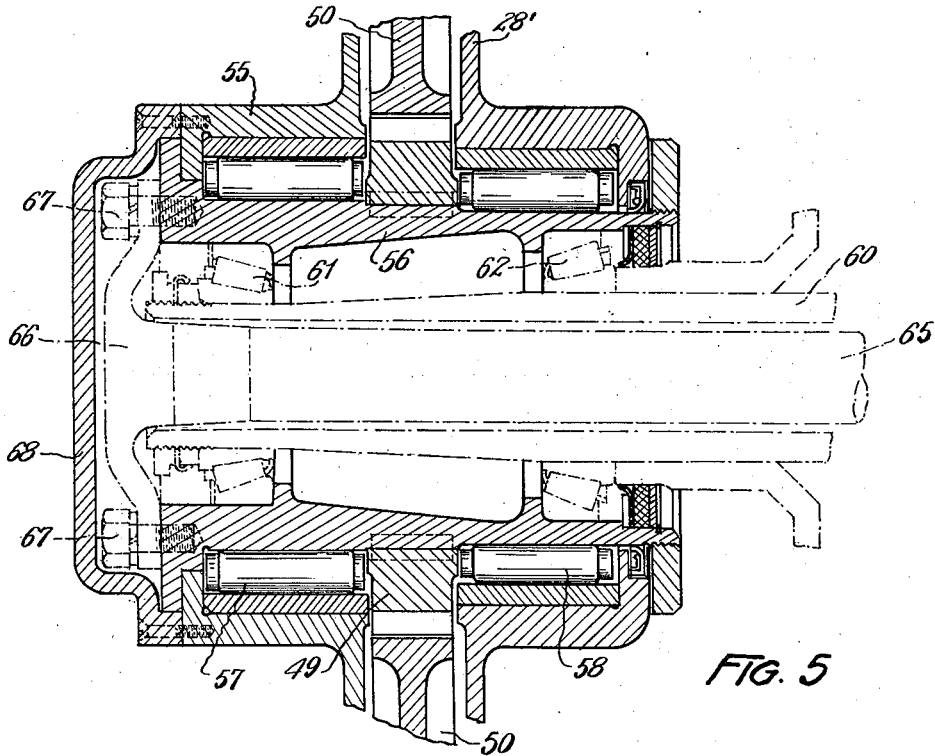
Fig. 5 is a section similar to Fig. 4 but showing a modified construction.

Fig. 5 illustrates a modified construction of the invention illustrated in Figs. 1 to 4 inclusive. The modification illustrated in this figure is adapted to be applied to a shaft drive truck and is similar in construction to that illustrated in Figs. 1 to 4 inclusive, with the exception of the mounting of the axle. As illustrated in this figure, the housing 28' is provided with an enlarged hub 55 and is pivotally supported on a sleeve member 56 by anti-friction bearings 57 and 58. The sleeve member 56 is rotatably supported on the stationary axle housing 60 by anti-friction bearings 61 and 62, and is driven from the drive axle 65 by a disk member 66 bolted thereto by the bolts 67. A hub cap 68 closes the end of the hub 55.

Figure 6:
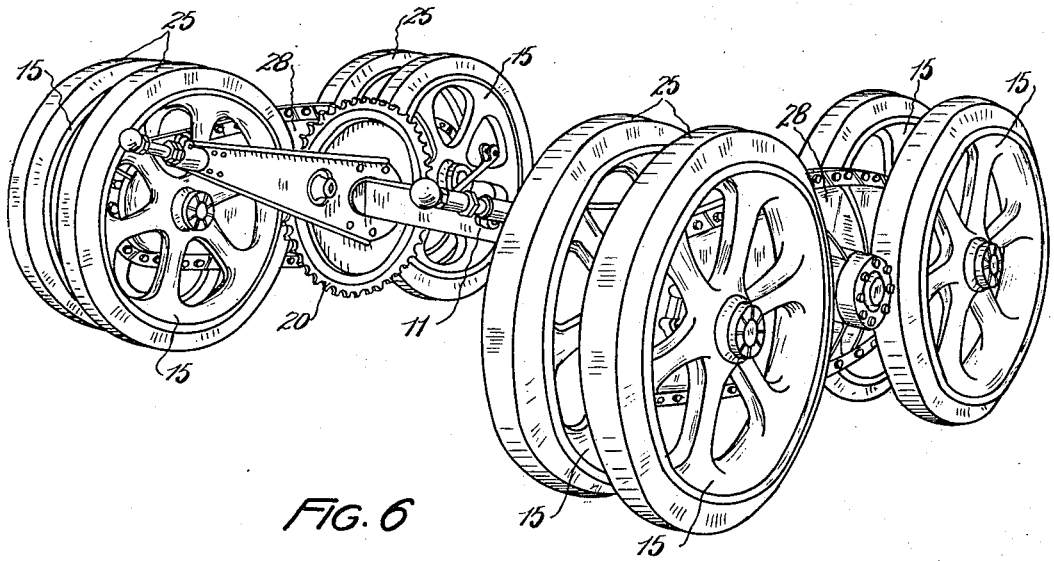
Fig. 6 is a perspective of an eight wheel drive rear axle assembly.

While the invention has been described based upon the substitution of a four wheel drive wheel unit for the wheel unit of the truck, it is to be understood that the entire rear axle assembly may be built as an eight wheel drive unit and substituted for the rear axle assembly of the truck. Such a construction is illustrated in Fig. 6, which shows an eight wheel drive rear axle assembly adapted to replace the rear axle assembly in a conventional truck, and in construction is a duplicate of that shown in Figs. 1 and 2.

While the invention has been illustrated in Figs. 1 to 4 inclusive, and 6, as applied to a chain drive truck, and in Fig. 5 as applied to another type of truck, it is to be understood that the particular construction shown is merely illustrative of the invention, and the construction shown may be varied within the scope of the invention to apply the same to any motor driven vehicle, and I particularly point out and claim as my invention the following:

1. An attachment for a motor driven vehicle adapted to be substituted for and replace a road wheel assembly of a chain drive motor driven vehicle, comprising a member adapted to be rotatably supported about the axle of said vehicle, a sprocket wheel on said member adapted to be operatively connected to the drive sprocket of said vehicle, a frame member pivotally supported coaxial with said member and the axle of said vehicle with a bearing on said member, a plurality of road wheels on both sides of said frame member rotatably connected thereto at opposite sides of the axle of said vehicle, and means for operatively connecting said member and said road wheels for driving the latter.

2. An attachment for a motor driven vehicle adapted to be substituted for and replace a road wheel assembly of a conventional chain drive motor driven vehicle, comprising a member adapted to be rotatably supported about the axle of said vehicle, a sprocket wheel on said member adapted to be operatively connected to the drive sprocket of said vehicle, a housing pivotally supported by both said member and the axle of said vehicle, a plurality of road wheels on both sides of said housing rotatably connected thereto at opposite sides of the axle of said vehicle, and means within said housing for operatively connecting said member and said road wheels for driving the latter.

3. In a chain drive motor driven vehicle, comprising a member adapted to be rotatably supported about the axle of said vehicle, a sprocket wheel on said member adapted to be operatively connected to the drive sprocket of said vehicle, a frame member pivotally supported coaxial with said member and the axle of said vehicle with a bearing on said member, a plurality of road wheels on both sides of said frame member rotatably connected thereto at opposite sides of the axle of said vehicle, and means for operatively connecting said member and said road wheels for driving the latter.

4. In a chain drive motor driven vehicle, comprising a member adapted to be rotatably supported about the axle of said vehicle, a sprocket wheel on said member adapted to be operatively connected to the drive sprocket of said vehicle, a housing pivotally supported by both said member and the axle of said vehicle, a plurality of road wheels on both sides of said housing rotatably connected thereto at opposite sides of the axle of said vehicle, and means within said housing for operatively connecting said member and said road wheels for driving the latter.

5. In a chain drive motor driven vehicle, the combination of an axle, a member journaled on said axle, a sprocket wheel on said member adapted to be operatively connected to the drive sprocket of the vehicle, a frame member pivotally supported coaxial with said member and said axle, with a bearing on said member, a plurality of road wheels rotatably supported by said frame member at opposite sides of said axle, and means for operatively connecting said member and said road wheels for driving the latter.

6. In a motor driven vehicle the combination of an axle, a member journaled on said axle, means for operatively connecting said member with the drive of the vehicles, a frame member pivotally supported coaxial with said member and said axle with a bearing on said member, road wheels rotatably connected to said frame member at opposite sides of said axle, and means for operatively connecting said member and said road wheels for driving the latter.

ARTHUR S. MEYER.